US007058131B2

(12) United States Patent
Dreps et al.

(10) Patent No.: US 7,058,131 B2
(45) Date of Patent: Jun. 6, 2006

(54) SIGNAL TRANSMISSION SYSTEM WITH PROGRAMMABLE VOLTAGE REFERENCE

(75) Inventors: Daniel M. Dreps, Georgetown, TX (US); Frank D. Ferraiolo, Essex Junction, VT (US); Daniel L. Stasiak, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 10/007,191

(22) Filed: Nov. 8, 2001

(65) Prior Publication Data

US 2003/0086501 A1 May 8, 2003

(51) Int. Cl.
*H04B 3/00* (2006.01)
*H04L 25/00* (2006.01)

(52) U.S. Cl. .................... 375/257; 326/30; 326/38; 326/83

(58) Field of Classification Search .............. 375/257, 375/284, 287, 242, 288; 711/105; 714/744, 714/724; 326/82, 30, 38, 83
See application file for complete search history.

(56) References Cited

U.S. PATENT DOCUMENTS

| | | | | |
|---|---|---|---|---|
| 3,993,867 A | * | 11/1976 | Blood, Jr. ................. 370/284 |
| 5,604,450 A | * | 2/1997 | Borkar et al. ............. 326/82 |
| 5,726,583 A | * | 3/1998 | Kaplinsky ................. 326/30 |
| 5,761,246 A | * | 6/1998 | Cao et al. ................. 375/287 |
| 5,872,471 A | * | 2/1999 | Ishibashi et al. ........... 327/98 |
| 6,105,157 A | * | 8/2000 | Miller ...................... 714/744 |
| 6,424,175 B1 | * | 7/2002 | Vangal et al. .............. 326/82 |
| 6,442,644 B1 | * | 8/2002 | Gustavson et al. ......... 711/105 |
| 6,642,740 B1 | * | 11/2003 | Kim et al. ................. 326/30 |

* cited by examiner

*Primary Examiner*—Stephen Chin
*Assistant Examiner*—Ted M. Wang
(74) *Attorney, Agent, or Firm*—Richard F. Frankeny; Winstead Sechrest & Minick P.C.; Casimer K. Salys

(57) ABSTRACT

A high speed signal transmission system employs differential receivers for receiving data signals transmitted over circuit transmission lines. One input each receiver is coupled to the output of a transmission line and to a termination network. The termination network generates a termination voltage and a source impedance that is matched to the characteristic impedance of the transmission line. The other input of the receiver is coupled to a reference voltage. The termination voltage may be adjusted by programming signals while keeping the source impedance constant and matched to the transmission line. A test mode may be employed where known data signals are transmitted and received and the termination voltage is adjusted while monitoring the states of the received signals on the output of the receivers. In this manner, the system may be optimized or tested for noise margin in an actual operation environment without resorting to probing methods. The clock signal used to time the transmission of the data signals is likewise transmitted along with its complement on two additional transmission lines. The clock signals are received in termination networks like the data signals. Additionally, the two clock signals are coupled to the reference signal with resistor/capacitor filter networks generating a low frequency tracking voltage superimposed on the reference voltage further improving noise margins.

17 Claims, 5 Drawing Sheets

FIG. 4

No. of parallel resistors — 402 | Logic states of program signals — 403 / 401

| UP | DOWN | P1 301 | P2 302 | P3 303 | P4 304 |
|---|---|---|---|---|---|
| 5 | 5 | 1 | 0 | 0 | 0 |
| 6 | 4 | 0 | 0 | 0 | 1 |
| 4 | 6 | 1 | 1 | 0 | 0 |
| 7 | 3 | 0 | 1 | 0 | 1 |
| 3 | 7 | 1 | 0 | 1 | 0 |
| 8 | 2 | 0 | 1 | 1 | 0 |
| 2 | 8 | 1 | 1 | 1 | 0 |
| 9 | 1 | 0 | 0 | 0 | 1 |
| 1 | 9 | 1 | 1 | 0 | 1 |
| 10 | 0 | 0 | 0 | 1 | 1 |
| 0 | 10 | 1 | 1 | 1 | 1 |

Results using 500 Ω resistors — 405 / Source resistance of Terminating network — 404 / Logic states of program signals — 403 / 402

| UP | DOWN | $Z_T$ | P1 301 | P2 302 | P3 303 | P4 304 |
|---|---|---|---|---|---|---|
| 100 Ω | 100 Ω | 100 Ω // 100 Ω = 50 Ω | 1 | 0 | 0 | 0 |
| 83 Ω | 125 Ω | 83 Ω // 125 Ω = 50 Ω | 0 | 0 | 0 | 1 |
| 125 Ω | 83 Ω | 125 Ω // 83 Ω = 50 Ω | 1 | 1 | 0 | 0 |
| 71 Ω | 166 Ω | 71 Ω // 166 Ω = 50 Ω | 0 | 1 | 0 | 1 |
| 166 Ω | 71 Ω | 166 Ω // 71 Ω = 50 Ω | 1 | 0 | 1 | 0 |
| 62.5 Ω | 250 Ω | 62.5 Ω // 250 Ω = 50 Ω | 0 | 1 | 1 | 0 |
| 250 Ω | 62.5 Ω | 250 Ω // 62.5 Ω = 50 Ω | 1 | 1 | 1 | 0 |
| 55.5 Ω | 500 Ω | 55.5 Ω // 500 Ω = 50 Ω | 0 | 0 | 0 | 1 |
| 500 Ω | 55.5 Ω | 500 Ω // 55.5 Ω = 50 Ω | 1 | 1 | 0 | 1 |
| 50 Ω | ∞ | 50 Ω // ∞ = 50 Ω | 0 | 0 | 1 | 1 |
| ∞ | 50 Ω | ∞ // 50 Ω = 50 Ω | 1 | 1 | 1 | 1 |

SIGNAL TRANSMISSION SYSTEM WITH PROGRAMMABLE VOLTAGE REFERENCE

TECHNICAL FIELD

The present invention relates in general to circuits for transmitting digital signals between integrated circuits on circuit lines treated as transmission lines.

BACKGROUND INFORMATION

Computer systems typically have the integrated circuits (ICs) interconnected on a motherboard. These ICs send signals between various circuit functions using drivers and receivers. On-chip circuits use drivers and receivers configured for the on-chip transmission lines which are typically very short but highly resistive and lossy. Off-chip drivers are used for signals transmitted between ICs. As off-chip communication speeds have increased, the lines interconnecting the ICs should be treated as transmission lines when their lengths are long relative to the fundamental wavelengths of the signals they transmit. Off-chip transmission lines are typically low-loss with characteristic impedances typically between 50 and 70 ohms.

Off-chip drivers that have signal swings extending to the power supply rails require high currents relative to the currents for on-chip driver circuits. As off-chip driver speeds have increased so has the number of bits for the data buses used in off-chip communication. Most logic in the various ICs making up a computer system are synchronous, wherein a system clock is used to time when data is transmitted or applied to one end of a transmission line and when it is sampled by the receiver at the other end of the transmission line.

Various types of noise may result from off-chip driving including simultaneous switching noise, electric and magnetic field coupling between signal transmission lines, etc. Likewise, the power supply noise resulting from large current spikes during simultaneous switching in an IC transmitting signals may be different from the power supply noise present at an IC receiving the signals. As system clocking speeds have increased, the power supply voltages have been decreased to manage power. The higher speed operation along with lower power supply voltages may lead to decreased noise margins. Some of the noise experienced in off-chip communication may be common mode where the noise appears simultaneously on both the voltage and ground lines (planes) of the motherboard. To improve the noise rejection when receiving off-chip signals, differential receivers are often used where the receivers are biased at a reference level (e.g., one half the power supply voltage).

It is also advantageous to terminate the transmission lines interconnecting ICs in the characteristic impedance of the transmission line. While the transmission line may be series or source terminated, far end termination often provides the best overall performance at the expense of power dissipation especially when the transmission line network has multi-drop nets (e.g., a particular bit is coupled to more than one IC). All the above factors create a signal transmission environment which is difficult to optimize so as to ensure the best possible noise margins.

There is, therefore, a need for signal transmission circuitry and a method for optimizing the noise margins in high speed digital signal transmission and reception.

SUMMARY OF THE INVENTION

Embodiments of the present invention disclose a signal transmission system and method for communication between integrated circuits (ICs) where the clock rates are at a frequency where the signal lines must be considered as transmission lines. The signal transmission system uses data line drivers that are each far-end terminated in a termination network which is coupled to one input of a differential receiver; the second input of the differential receiver is coupled to a reference network. The termination network generates a termination voltage by dividing the receiver power supply voltage in a programmable voltage divider network that allows the reference voltage to be varied up and down while maintaining a constant termination impedance. The data is clocked at the driver by a clock signal whose output levels are a function of the driver power supply voltage. Likewise, the data signals have output levels that are functions of the driver power supply voltage. At the same clock time that the data signals are transmitted, a clock and an inverted clock are transmitted using line drivers like those for the data signals. The clock signals are each terminated in a termination network like the data lines. In addition, each clock signal is coupled through a resistor/capacitor filter network to an output node generating the reference voltage. Since one of the clock signals is always at a logic one, representative of the driver power supply, the output node of the clock termination network has a variation corresponding to the driver power supply voltage at the time of signal transmission. The data termination networks have programmable resistor dividers that allow the termination voltage to be varied under system control to optimize noise margins or to test the signal transmission network. The clock termination voltage has filtered variations of the driver and receiver power supply voltages coupled to it to allow the threshold level of the receivers to track changes in the driver power supply voltages to further optimize noise margins.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a table illustrating programming of the terminator of FIG. 3; and

DETAILED DESCRIPTION

Figure 1:
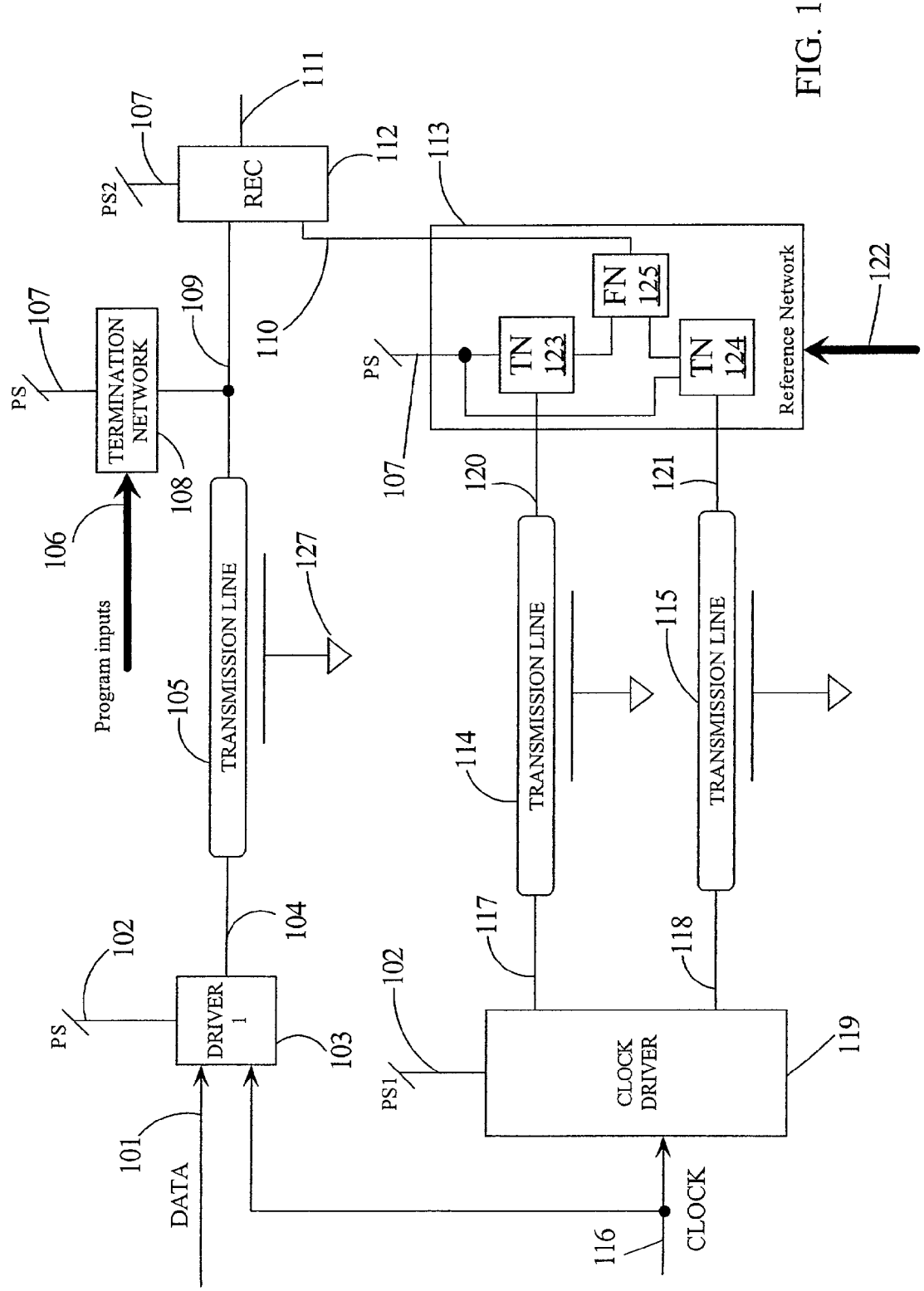
FIG. 1 is a block diagram of a signal transmission system according to embodiments of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views. In the following detailed descriptions, a logic zero is a low or zero voltage and a logic one is a high or a plus supply voltage to simplify explanation of embodiments of the present invention.

FIG. 1 is a block diagram of a signal transmission system according to embodiments of the present invention. A data signal 101 is coupled to driver (DR) 103 which is "clocked" by clock (CLK) signal 116. DR 103 is powered by power supply (PS) 102 and generates a data output (DO) signal 104 in response to clock edges of CLK signal 116. DO signal 104 is transmitted by transmission line (TL) 105 to receiver (REC) 112 which is powered by PS 107 which has a return ground 127. PS 102 and PS 107 may be the same potential but are differentiated because they may be remote from each other and may have different noise conditions. All the ground returns of PS 102 and PS 107 may not be shown or labeled in FIG. 1 to simplify the drawing. REC 112 generates receiver output 111 in response to the difference in the voltages received on it inputs 109 and 110. In a synchronous system, REC 112 is "sampled" by edges of a clock synchronous with CLK 116. Termination network (TN) 108 is used to match the impedance of the receiver to the characteristic impedance of TL 105. TN 108 generates a termination voltage (VT) 109 and has a termination source impedance (ZT). TN 108 is programmed by program signals 106 to vary VT 109 while keeping ZT at a fixed value. ZT is not shown in FIG. 1 but is internal to the termination network 108. Clock driver (CDR) 119 receives CLK signal 116 and generates a clock output (CLK_Out) signal 117 and a complement CLK_Out signal 118. CLK_Out 117 is transmitted on TL 114 and received at output 120 which is coupled to reference network (RN) 113. CLK_Out 118 is transmitted on TL 115 and received at output 121 which is also coupled to reference network (RN) 113. RN 113 comprises TN 123 for TL 114 and TN 124 for TL 115. The outputs of TN 123 and 124 are coupled to a filter network (FN) 125 which generates reference output 110. RN 113 is programmed with program signals 122. RN 113 generates an output 110 in response to the received CLK_Out 117 and 118. Output 110 is coupled to REC 112 and generates a modified threshold voltage for REC 112.

A repetitive data pattern may be transmitted on a TL 105. When a repetitive data pattern is transmitted and received, successive transitions between a logic one and a logic zero, after reception, may not happen at precisely the same time even though they may have been transmitted at the same time. This is due to the uncertainties in the transmission and detection during reception of the transmitted data in exemplary REC 112. If one views a transition of a repetitive data pattern on an oscilloscope, an "eye" pattern would be apparent. This occurs as a particular observed transition in the repetitive data pattern varies around the ideal timing due to uncertainties. The eye pattern results as a larger number of transitions occur on either side of an ideal transition timing leaving an open area in the display.

Using a repetitive data pattern, termination network 108 may be programmed with program signals 106 to vary VT 109 while keeping the termination impedance ZT constant. Per bit error registers maybe used in a system that employs signal transmission according to embodiments of the present invention to log failures that occur on received signals from output 111. Stress tests may be exercised to determine failure margins by varying exemplary voltage VT 109 while monitoring the error rate of the output of exemplary REC 112. Only one data line (e.g., DO 104) is shown in FIG. 1 to simplify the drawing. It is understood that embodiments of the present invention use multiple data lines with corresponding drivers, transmission lines, termination networks, program signals and receivers.

Figure 2:
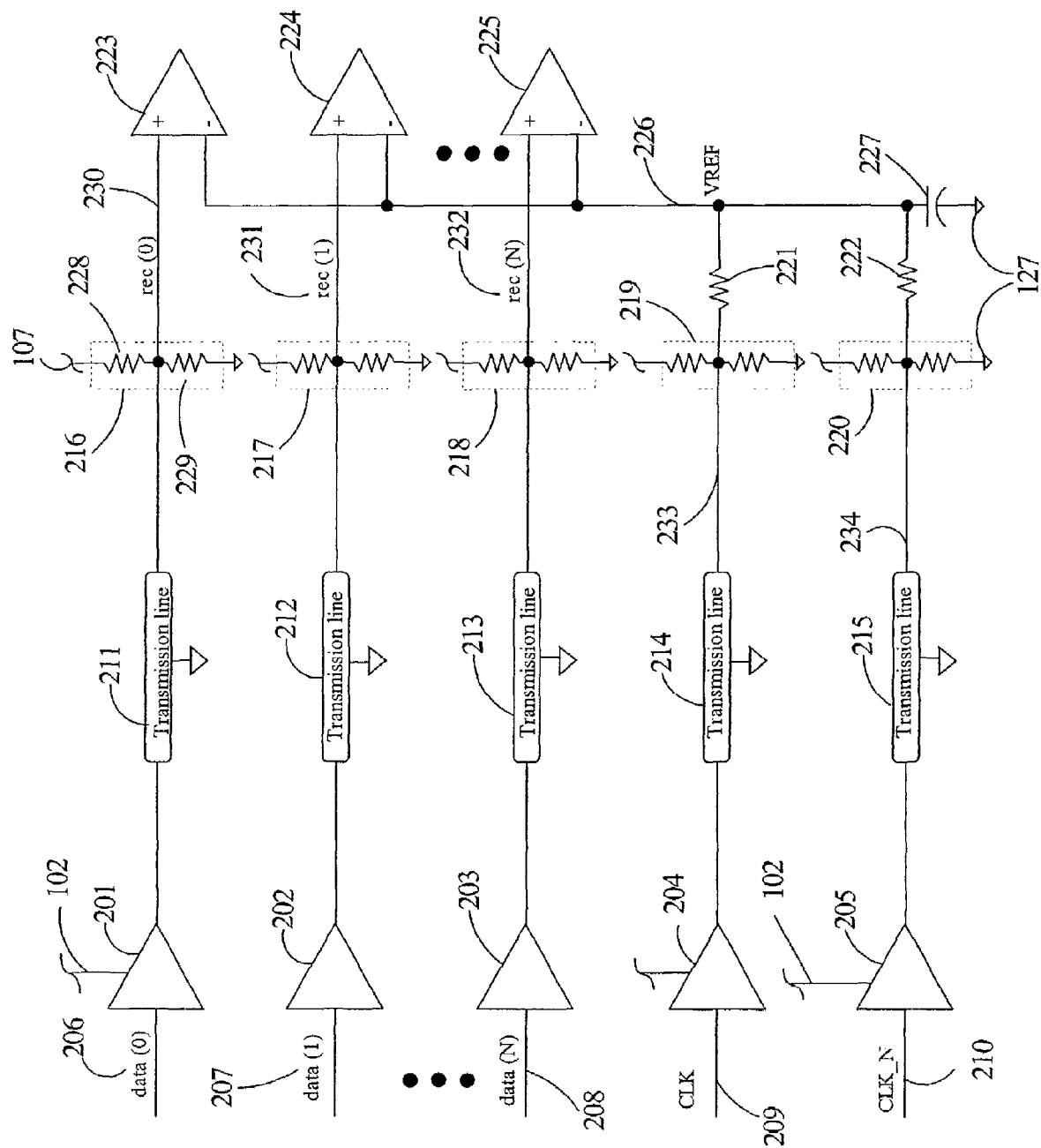
FIG. 2 is a detailed circuit diagram of an embodiment of the present invention showing data and clock lines terminated at receivers.

FIG. 2 is a circuit diagram of multiple data signals (D 206–D 208) with corresponding transmission lines (TL–211–TL 213) and receivers (REC 223–REC 225), respectively. Nodes 230–232 are terminated in voltage divider termination networks TN 216–TN 218. A termination network (e.g., TN 216) is designed to have terminator voltage (V 230) determined by PS 107 and the divider ratio of resistors 228 and 229. While the resistors in each of the dividers 216–220 are shown fixed resistors, dividers 216–220 may receive program inputs which allow characteristics of the dividers to be varied. The programming of dividers 216–220 is not shown in FIG. 2 for simplicity, but a divider may be like a programmable divider 108 as shown in FIG. 3.

A differential receiver (e.g., REC 223) receives a reference voltage VREF 226 and generates an output in response to the difference in the voltages received on its inputs. Common mode noise (noise appearing of both the power supply 107 and ground 127 is reduced (rejected) by the differential characteristics of a differential receiver (e.g., REC 223). Clock driver DR 204 transmits CLK_Out 209 on TL 214 to TL output 233 which is terminated in TN 219. Likewise, the complement clock CLK_NOut 210 is transmitted on TL 215 to TL output 234 which is terminated in TN 220. TL output 233 is coupled to capacitor (C) 227 with resistor (R) 221 and TL output 234 is coupled to C 227 with R 222. C 227 operates to low pass filter the signals on TL output 233 and TL output 234 to modify VREF 226. C 227 maybe configured as two capacitors of one-half the value of C 227, one from VREF 226 to ground 127 and one from VREF 226 to the power supply voltage 107. VREF 226 will be a composite of the direct current (DC) levels on node 233 and 234 as well as the filtered alternating current (AC) signals caused by the dynamics of CLK_Out 209 and CLK_NOut 210. Either CLK_Out 209 or CLK_NOut 210 is always at a logic one except for the times the two signals have concurrent signal transitions. R 221 and R 222 may be sized along with C 227 so that VREF 226 has a level that tracks the low frequency variations of PS 102 and PS 107. These low frequency variations may be caused by distribution losses, simultaneous switching noise, or other noise sources. If these variations appear on both the clock signals and the data signals, then the receivers (e.g., REC 223–REC 225) reduce the effects of the variations by their common mode rejection characteristics. Additionally, if TN 216–TN 220 are programmable, then the terminating voltages on nodes 230–232 may be modified to optimize signal detection and improve noise margins.

Figure 3:
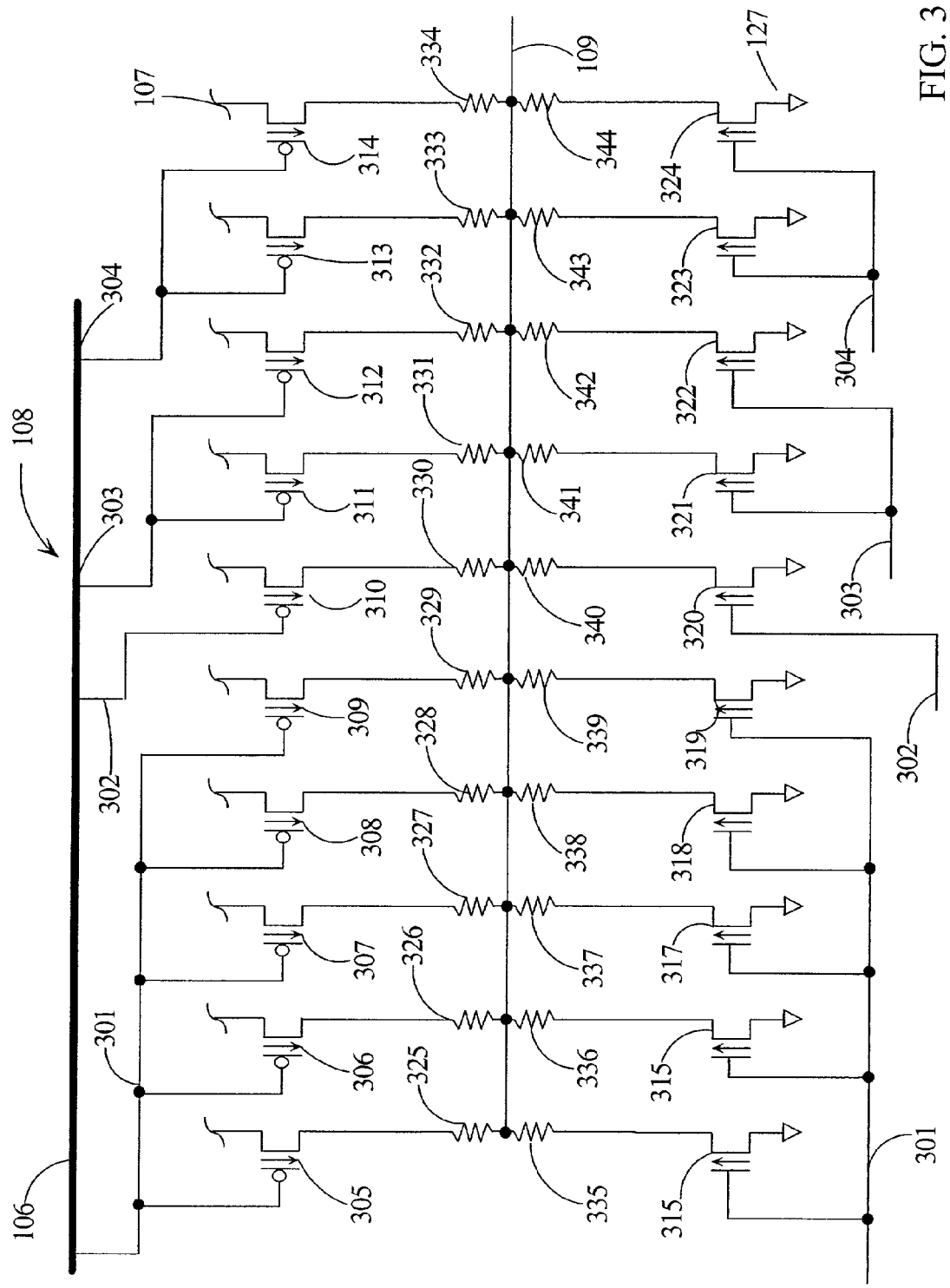
FIG. 3 is a detailed circuit diagram of a programmable terminator according to embodiments of the present invention.

FIG. 3 is a circuit diagram of exemplary termination network TN 108 which is programmable with program signals 106 according to embodiments of the present invention. In one embodiment of the present invention, resistors R 325–R 344 all have the same value. R 325–R 329 and R 335–R 339 are grouped in one circuit corresponding to their common program signal (PRS) 301. If PRS 301 is a logic zero, then R 325–R 329 are coupled in parallel to node 109 and PS 107. Likewise if PRS 301 is a logic one, then R 335–R 339 are coupled in parallel to node 109 and ground 127. The resistors R 325–R 334 and R 335–R344 are selected in a group of five, one, and two groups of two. This allows the selection of all groups of resistors in pairs (5,5), (6,4), (4,6), (7,3), (3,7), (8,2), (2,8), (9,1), (1,9) (10,0) and (0,10). The fact that the resistors are the same value allows the parallel combination of the resistors as "seen" at node 109 to always be a constant resistance. For example, if each resistor R325–R344 is 500 ohms, then the circuit in FIG. 3 allows the voltage at node 109 to be varied from PS 107 to ground 127 in ten incremental steps. Likewise, the resistance as seen at node 109 is a constant 50ohms, 500 ohms divided by 10. Ten is the number of resistors in each possible parallel grouping.

It may be desirable to make the terminating networks out of groups of like resistors to improve matching. For the above example ten parallel 500 ohm resistors are used for the upper and lower branches for TN 108. Other values of resistors may be used for other impedances by scaling the resistor values. If it is desired to use groups of like resistors to generate a number of N increments of the terminating voltage according to embodiments of the present invention, there is only one minimum number of M of program inputs 106 corresponding to each number N. For N=10 there are a minimum of four parallel networks with equivalent branch resistances of, 500 ohms, 250 ohms, 250ohms and 100 ohms. If twelve increments of the terminating voltage are desired, while maintaining a terminating resistance of 50 ohms, then twelve 600 ohm resistors grouped in four parallel networks would be necessary with equivalent branch resistances of, 600ohms, 300 ohms, 200 ohms and 100 ohms. Other increments may be used and still be withing the scope of the present invention.

In FIG. 4, table 401 shows the number of parallel resistors in columns 402 (for ten increments) in the "UP" circuit (circuit between node 109 and PS 107) and the "DOWN" circuit (circuit between node 109 and ground 127). The columns 403 in table 401 list the states of the program signals P1 301, P2 302, P3 303 and P4 304 used to generate the variable termination conditions on node 109. Columns 405, in table 402, list the resulting parallel resistances of the UP circuit and the DOWN circuit. The resulting terminator source resistance is shown in column 404.

Figure 5:
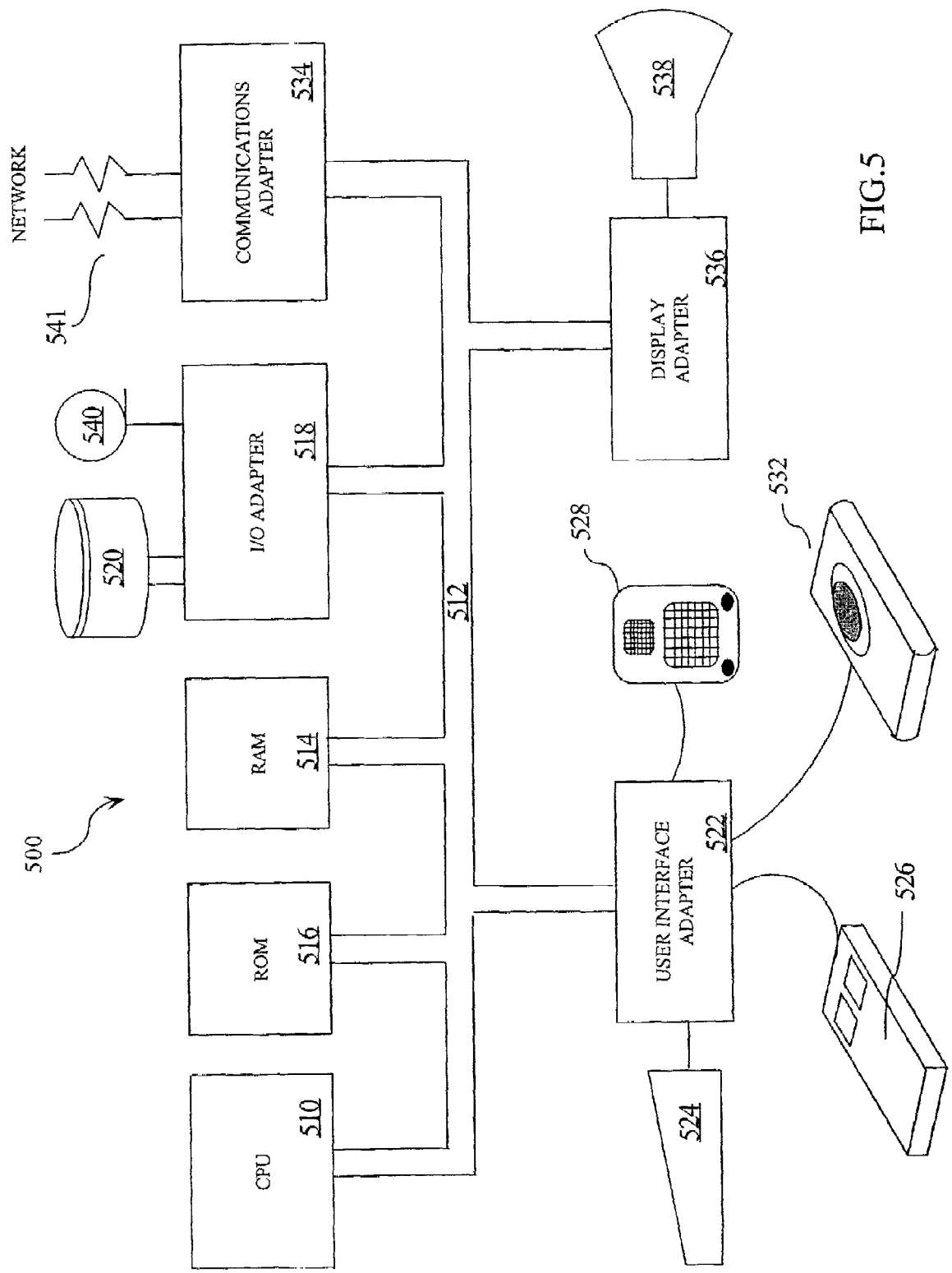
FIG. 5 is a block diagram of a data processing system suitable to practice embodiments of the present invention.

FIG. 5 is a high level functional block diagram of a representative data processing system 500 suitable for practicing the principles of the present invention. Data processing system 500, includes a central processing system (CPU) 510 operating in conjunction with a system bus 512. System bus 512 operates in accordance with a standard bus protocol, such that as the ISA protocol, compatible with CPU 510. CPU 510 operates in conjunction with electronically erasable programmable read-only memory (ROM) 516 and random access memory (RAM) 514. Among other things, ROM 516 supports storage the Basic Input Output System (BIOS) data. RAM 514 includes, DRAM (Dynamic Random Access Memory) system memory and SRAM (Static Random Access Memory) external cache. I/O Adapter 518 allows for an interconnection between the devices on system bus 512 and external peripherals, such as mass storage devices (e.g., a hard drive, floppy drive or CD/ROM drive), or a printer 540. A peripheral device 520 is, for example, coupled to a peripheral control interface (PCI) bus, and I/O adapter 518 therefore may be a PCI bus bridge. User interface adapter 522 couples various user input devices, such as a keyboard 524, mouse 526, touch pad 532 or speaker 528 to the processing devices onbus 512. Display 538 which maybe, for example, a cathode ray tube (CRT), liquid crystal display (LCD) or similar conventional display units. Display adapter 536 may include, among other things, a conventional display controller and frame buffer memory. Data processing system 500 may be selectively coupled to a computer or telecommunications network 541 through communications adapter 534. Communications adapter 534 may include, for example, a modem for connection to a telecom network and/or hardware and software for connecting to a computer network such as a local area network (LAN) or a wide area network (WAN). CPU 510 may comprise one or more processor ICs with one or more line drivers (e.g., DR 103) transmitting data (e.g., DATA 101) and clock signals (e.g., CLK_Out 117 and CLK_ONout 118) on motherboard transmission lines (e.g., TL 105, TL 114 and TL 115) to supporting ICs that have one or more corresponding differential receivers (e.g., REC 112), termination network (e.g., TN 108) and a reference network (e.g., RN113) while using embodiments of the present invention to optimize or test noise margins. Likewise, CPU 510 and other components of data processing system 500 may transmit data and clock signals on motherboard transmission lines (e.g. TL 105, TL 114 and TL 115) to subsystems (e.g. RAM 514) which have one or more receivers (e.g., REC 112) coupled to termination networks(e.g, TN 108) according to embodiments of the present invention. CPU 510 may contain circuits for modifying a terminating voltage level (e.g., VT 109) of a termination network (e.g., TN 108) while maintaining a constant source impedance to set or test noise margin according to embodiments of the present invention.

The present invention and its advantages have been described in detail, it should be understood that various changes, substitutions and alterations can be made herein without departing from the spirit and scope of the invention as defined by the appended claims.

What is claimed is:

1. A digital signal transmission system comprising:
a first driver circuit receiving a first data input signal and generating a first driver output signal in response to a clock signal, said first driver output coupled to a first input of a first transmission line;
a receiver circuit having a first receiver input coupled to a first output of said first transmission line and a second receiver input coupled to a reference voltage; and
a first terminating network receiving programming signals and generating a first terminating voltage with a first source impedance at a first node, said first node coupled to said first output of said first transmission line, wherein said first terminating voltage is modified in response to said programming signals while maintaining a pre-determined magnitude of said first source impedance.

2. A digital signal transmission system comprising:
a first driver circuit receiving a first data input signal and generating a first driver output signal in response to a clock signal, said first driver output coupled to a first input of a first transmission line;
a receiver circuit having a first receiver input coupled to a first output of said first transmission line and a second receiver input coupled to a reference voltage;
a first terminating network receiving programming signals and generating a first terminating voltage with a first source impedance at a first node, said first node coupled to said first output of said first transmission line, wherein said first terminating voltage is modified in response to said programming signals while maintaining a pre-determined magnitude of said first source impedance;

a second driver circuit receiving said clock signal and generating a first clock output signal coupled to a second input of a second transmission line;

a second terminating network generating a second terminating voltage with said first source impedance at a second node, said second node coupled to a second output of said second transmission line;

a third driver circuit receiving said clock signal and generating a second clock output signal coupled to a third input of a third transmission line, said second clock output signal a complement of said first clock output signal;

a third terminating network generating a third terminating voltage with said first source impedance at a third node, said third node coupled to a third output of said third transmission line; and a filter network receiving said second and third outputs and generating said reference voltage.

3. The digital signal transmission system of claim 2, wherein said filter network comprises:

a first resistor coupled to said second output and to a reference node;

a second resistor coupled to said third output and said reference node; and a capacitor coupled to said reference node and at least one potential of said second power supply voltage, said reference node generating said reference voltage.

4. The digital signal transmission system of claim 2, wherein said first terminating network comprises:

a number N resistor voltage divider circuits each having an output node, a positive voltage node, and a negative voltage node;

a first electronic switch coupled from each one of said positive voltage nodes to a positive potential of a power supply voltage, each of said first electronic switches controlled by one of said programming signals; and a second electronic switch coupled from each one of said negative voltage nodes to a negative potential of said power supply voltage, each of said second electronic switches controlled by said corresponding one of said programming signals, wherein each of said first electronic switches couples said first voltage to one of said positive voltage nodes in response to a first state of said one of said programming signals and each of said second electronic switches couples said second voltage to one of said negative voltage nodes in response to a second state of said corresponding one of said programming signals, and wherein said output nodes of each of said plurality of voltage divider networks are coupled forming said first node, said first node generating said first terminating voltage with said corresponding first source impedance.

5. The digital signal transmission system of claim 2, wherein said first terminating voltage is modified in a number M integer increments.

6. The digital signal transmission system of claim 5, wherein said number N corresponds to a minimum number of said N resistor voltage divider networks necessary to generate said M integer increments of said first terminating voltage.

7. A digital signal transmission system comprising:

a driver circuit in a first integrated circuit (IC) receiving a data signal and generating a data signal output, said data signal output coupled to a first input of a first transmission line;

a termination network in a second IC receiving programming signals and generating a termination voltage having a first source impedance in response to said programming signals at a termination node, wherein said termination node is coupled to an output of said first transmission line;

a differential receiver in said second IC having a second input coupled to said termination node and a third input coupled to a reference voltage; and a reference network receiving a first clock transmitted from said first IC with a second transmission line, a second clock transmitted from said first IC with a third transmission line, and said programming signals and, generating said reference voltage in response to the first and second clock, wherein said terminating voltage is varied in response to said programming signals while maintaining a pre-determined magnitude of said first source impedance.

8. A method for optimizing a noise margin in a digital signal transmission system comprising the steps of:

transmitting a data signal on a first transmission line at transitions of a clock signal;

receiving an output of said first transmission line at a first input of a differential input receiver, said first input coupled to a first node of a terminating network receiving programming signals and generating a first terminating voltage with a first source impedance at said first node;

coupling a second input of said differential receiver to a reference voltage;

modifying said terminating voltage in response to said programming signals;

monitoring an output of said differential receiver for a quality of a received data signal; and setting said first terminating voltage at an optimized level corresponding to said quality of said received data signal.

9. The method of claim 8 further comprising the steps of:

transmitting said clock signal on a second transmission line terminated at a second node of a second termination network generating a second terminating voltage with a second source impedance at said second node;

transmitting a complement of said clock signal on a third transmission line terminated at a third node of a third termination network generating a third termination voltage with a third source impedance at said third node; and coupling said second and third node to a reference node using a first filter network, said reference node generating said reference voltage.

10. The method of claim 8, wherein said first source impedance remains fixed during said step modifying of said terminating voltage.

11. A data processing system comprising:

a processor central processing unit (CPU) integrated circuit (IC) chip operable to transmit off-chip signals, having circuitry for transmitting a digital signal on a first transmission line corresponding to edges of a clock signal, circuitry for terminating said first transmission line in a programmable terminating voltage having a source impedance, said programmable terminal voltage modified in response to first program signals, and circuitry for receiving said digital signal at a first receiver input coupled to said programmable terminal voltage and an output of said first transmission line, receiving a reference voltage at a second receiver input coupled, and generating a receiver output;

a random access memory (RAM); and a bus system coupling said CPU to said RAM, wherein said terminal voltage is modified while controlling the magnitude of said source impedance to optimize said received digital signal.

12. A data processing system comprising:

a processor central processing unit (CPU) integrated circuit (IC) chip operable to transmit off-chip signals, having circuitry for transmitting a digital signal on a first transmission line corresponding to edges of a clock signal, circuitry for terminating said first transmission line in a programmable terminating voltage having a source impedance. said programmable terminal voltage modified in response to first program signals, and circuitry for receiving said digital signal at a first receiver input coupled to said programmable terminal voltage and an output of said first transmission line, receiving a reference voltage at a second receiver input coupled, and generating a receiver output;

a random access memory (RAM);

a bus system coupling said CPU to said RAM, wherein said terminal voltage is modified while controlling the magnitude of said source impedance to optimize said received digital signal;

circuit for transmitting said signal at a second output of said second transmission line;

circuitry for terminating a complement of said clock signal on a third transmission;

circuitry for terminating said complement clock signal at a third output of said third transmission line; and circuitry for coupling said second output and said third output to said reference voltage, wherein said reference voltage is modulated by a selected frequency content of said clock signal and said complement clock signal.

13. A signal transmission system comprising:

circuitry for transmitting a digital signal on a first transmission line corresponding to edges of a clock signal;

circuitry for terminating said first transmission line in a programmable terminal voltage having a source impedance, said programmable terminal voltage modified in response to first program signals; and circuitry for receiving said digital signal in a first receiver input coupled to said programmable terminal voltage and an output of said first transmission line and generating a receiver output in response to said received digital signal and a reference voltage coupled to a second receiver input, wherein said programmable terminating voltage is modified to optimize said received digital signal.

14. A signal transmission system comprising:

circuitry for transmitting a digital signal on a first transmission line corresponding to edges of a clock signal;

circuitry for terminating said first transmission line in a programmable terminal voltage having a source impedance, said programmable terminal voltage modified in response to first program signals;

circuitry for receiving said digital signal in a first receiver input coupled to said programmable terminal voltage and an output of said first transmission line and generating a receiver output in response to said received digital signal and a reference voltage coupled to a second receiver input, wherein said programmable terminating voltage is modified to optimize said received digital signal;

circuitry for transmitting said clock signal on a second transmission line;

circuitry for transmitting a complement of said clock signal on a third transmission;

circuitry for terminating said clock signal at a second output of said second transmission line;

circuitry for terminating said complement clock signal at a third output of said third transmission line; and circuitry for coupling said second output and said third output to said reference voltage, wherein said reference voltage is modulated by a selected frequency content of said clock signal and said complement clock signal.

15. A digital signal transmission system comprising:

a first driver circuit receiving a first data input signal and generating a first driver output signal in response to a clock signal, said first driver output coupled to a first input of a first transmission line;

a receiver circuit having a first receiver input coupled to a first output of said first transmission line and a second receiver input coupled to a reference voltage; and a first terminating network receiving programming signals and generating a first terminating voltage with a first source impedance at a first node, said first node coupled to said first output of said first transmission line, said first terminating voltage modified in response to said programming signals while maintaining a predetermined magnitude of said first source impedance, wherein said first terminating network has a number N resistor voltage divider circuits each having an output node, a positive voltage node, and a negative voltage node, a first electronic switch coupled from each one of said positive voltage nodes to a positive potential of a power supply voltage, each of said first electronic switches controlled by one of said programming signals, and a second electronic switch coupled from each one of said negative voltage nodes to a negative potential of said power supply voltage, each of said second electronic switches controlled by said corresponding one of said programming signals, wherein each of said first electronic switches couples said first voltage to one of said positive voltage nodes in response to a first state of said one of said programming signals and each of said second electronic switches couples said second voltage to one of said negative voltage nodes in response to a second state of said corresponding one of said programming signals, and wherein said output nodes of each of said plurality of voltage divider networks are coupled forming said first node, said first node generating said first terminating voltage with said corresponding first source impedance.

16. The digital signal transmission system of claim 14, wherein said first terminating voltage is modified in a number M integer increments.

17. The digital signal transmission system of claim 16, wherein said number N corresponds to a minimum number of said N resistor voltage divider networks necessary to generate said M integer increments of said first terminating voltage.

* * * * *

UNITED STATES PATENT AND TRADEMARK OFFICE
CERTIFICATE OF CORRECTION

PATENT NO. : 7,058,131 B2
APPLICATION NO. : 10/007191
DATED : June 6, 2006
INVENTOR(S) : Dreps et al.

It is certified that error appears in the above-identified patent and that said Letters Patent is hereby corrected as shown below:

Claim 12, Column 9, line 30 and line 31, delete "circuit for transmitting said signal at a second output of said second transmission line;" and insert --circuitry for transmitting said clock signal on a second transmission line;--;

Claim 12, Column 9, line 32, after "circuitry for" delete "terminating" and insert --transmitting--;

Claim 12, Column 9, line 33, after "signal on a third transmission;" insert --circuitry for terminating said clock signal at a second output of said second transmission line;--

Signed and Sealed this

Fourth Day of September, 2007

JON W. DUDAS
*Director of the United States Patent and Trademark Office*